(12) United States Patent
Miner et al.

(10) Patent No.: US 10,399,176 B2
(45) Date of Patent: Sep. 3, 2019

(54) DUAL ALLOY TURBINE ROTORS AND METHODS FOR MANUFACTURING THE SAME

(71) Applicant: HONEYWELL INTERNATIONAL INC., Morris Plains, NJ (US)

(72) Inventors: Amandine Miner, Tempe, AZ (US);
David K. Jan, Fountain Hills, AZ (US);
Don Mittendorf, Mesa, AZ (US);
Jason Smoke, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 224 days.

(21) Appl. No.: 15/648,577

(22) Filed: Jul. 13, 2017

(65) Prior Publication Data
US 2017/0304929 A1    Oct. 26, 2017

Related U.S. Application Data

(62) Division of application No. 14/297,406, filed on Jun. 5, 2014, now Pat. No. 9,724,780.

(51) Int. Cl.
*F01D 5/30* (2006.01)
*B23K 1/00* (2006.01)
(Continued)

(52) U.S. Cl.
CPC .............. *B23K 20/028* (2013.01); *B23K 1/00* (2013.01); *B23K 1/0018* (2013.01);
(Continued)

(58) Field of Classification Search
CPC ................................. F01D 5/3061; F01D 5/34
See application file for complete search history.

(56) References Cited

U.S. PATENT DOCUMENTS

| 655,414 A | 8/1900 | Parsons et al. |
| 1,621,002 A | 3/1927 | Dimberg |

(Continued)

FOREIGN PATENT DOCUMENTS

| EP | 0042744 A1 | 12/1981 |
| EP | 0434580 A2 | 6/1991 |

(Continued)

OTHER PUBLICATIONS

Extended EP Search Report for Application No. 15167774.7-1702/2952687 dated Feb. 12, 2015.
(Continued)

*Primary Examiner* — Woody A Lee, Jr.
(74) *Attorney, Agent, or Firm* — Lorenz & Kopf, LLP

(57) ABSTRACT

Dual alloy turbine rotors and methods for manufacturing the same are provided. The dual alloy turbine rotor comprises an assembled blade ring and a hub bonded to the assembled blade ring. The assembled blade ring comprises a first alloy selected from the group consisting of a single crystal alloy, a directionally solidified alloy, or an equi-axed alloy. The hub comprises a second alloy. The method comprises positioning a hub within a blade ring to define an interface between the hub and the blade ring. The interface is a non-contacting interface or a contacting interface. The interface is enclosed by a pair of diaphragms. The interface is vacuum sealed. The blade ring is bonded to the hub after the vacuum sealing step.

19 Claims, 10 Drawing Sheets

(51) Int. Cl.
    *B23K 20/02*    (2006.01)
    *B23K 31/02*    (2006.01)
    *B23P 15/00*    (2006.01)
    *B23K 20/14*    (2006.01)
    *B23K 20/22*    (2006.01)
    *B23K 20/26*    (2006.01)
    *F01D 5/34*     (2006.01)
    *B23K 101/00*   (2006.01)
    *B23K 20/00*    (2006.01)

(52) U.S. Cl.
    CPC .......... *B23K 20/021* (2013.01); *B23K 20/023* (2013.01); *B23K 20/14* (2013.01); *B23K 20/22* (2013.01); *B23K 20/26* (2013.01); *B23K 31/02* (2013.01); *B23P 15/006* (2013.01); *F01D 5/3061* (2013.01); *F01D 5/34* (2013.01); *B23K 20/002* (2013.01); *B23K 2101/001* (2018.08); *F05D 2220/323* (2013.01); *F05D 2230/236* (2013.01); *F05D 2230/60* (2013.01); *F05D 2300/17* (2013.01); *F05D 2300/606* (2013.01); *F05D 2300/607* (2013.01); *Y10T 29/49323* (2015.01)

(56) References Cited

U.S. PATENT DOCUMENTS

| | | | |
|---|---|---|---|
| 2,347,034 A | 4/1944 | Doran | |
| 2,380,276 A | 7/1945 | Warren | |
| 2,392,281 A | 1/1946 | Robert | |
| 2,450,493 A | 10/1948 | Strub | |
| 3,083,446 A | 4/1963 | Stalker | |
| 3,292,245 A | 10/1966 | Pfau | |
| 4,084,922 A | 4/1978 | Glenn | |
| 4,152,816 A | 5/1979 | Ewing | |
| 4,447,188 A | 5/1984 | Davis et al. | |
| 4,581,300 A * | 4/1986 | Hoppin, III | B23K 20/00 428/546 |
| 4,587,700 A | 5/1986 | Curbishley et al. | |
| 4,784,572 A | 11/1988 | Novotny et al. | |
| 4,784,573 A | 11/1988 | Ress, Jr. | |
| 4,796,343 A | 1/1989 | Wing | |
| 4,812,107 A | 3/1989 | Barcella et al. | |
| 4,904,159 A * | 2/1990 | Wickoren | F04D 7/045 415/121.1 |
| 5,031,288 A | 7/1991 | Sadler | |
| 5,113,583 A | 5/1992 | Jenkel | |
| 5,122,033 A | 6/1992 | Paul | |
| 5,273,708 A | 12/1993 | Freeman | |
| 5,277,548 A | 1/1994 | Klein | |
| 5,292,385 A | 3/1994 | Kington | |
| 5,316,202 A | 5/1994 | Murray et al. | |
| 5,363,554 A | 11/1994 | Partridge et al. | |
| 5,587,700 A | 12/1996 | Williams | |
| 5,593,085 A | 1/1997 | Tohill | |
| 5,755,031 A | 5/1998 | Baumgarten et al. | |
| 6,061,886 A | 5/2000 | Nitta et al. | |
| 6,331,217 B1 | 12/2001 | Burke et al. | |
| 6,508,000 B2 | 1/2003 | Burke et al. | |
| 6,524,072 B1 | 2/2003 | Brownell et al. | |
| 6,591,613 B2 | 7/2003 | Simunek | |
| 6,666,653 B1 | 12/2003 | Carrier | |
| 6,916,150 B2 | 7/2005 | Liang | |
| 7,000,306 B2 | 2/2006 | Rice et al. | |
| 7,226,671 B2 | 6/2007 | Giesler et al. | |
| 7,832,986 B2 | 11/2010 | Baker et al. | |
| 8,206,117 B2 | 6/2012 | Strongman et al. | |
| 8,262,817 B2 | 9/2012 | Marshall et al. | |
| 8,408,446 B1 | 4/2013 | Smoke | |
| 2004/0117961 A1 | 6/2004 | Rice et al. | |
| 2005/0025613 A1 | 2/2005 | Strangman | |
| 2005/0232780 A1 | 10/2005 | Newman | |
| 2006/0239825 A1 | 10/2006 | Rice | |
| 2009/0081046 A1 | 3/2009 | Mace | |
| 2009/0119919 A1 | 5/2009 | Kington et al. | |
| 2009/0304514 A1 * | 12/2009 | Izadi | B23K 20/12 416/213 R |
| 2014/0023509 A1 | 1/2014 | Burt | |
| 2014/0234091 A1 | 8/2014 | Yokoyama | |
| 2015/0125301 A1 | 5/2015 | Headland | |
| 2016/0069203 A1 | 3/2016 | Aiello | |

FOREIGN PATENT DOCUMENTS

| | | |
|---|---|---|
| EP | 2047945 A1 | 4/2009 |
| GB | 599475 A | 3/1948 |
| GB | 2109274 A | 6/1983 |

OTHER PUBLICATIONS

EP Examination Report for Application No. 15167774.7 dated May 14, 2018.

Crapps, J. et al.; Development of the hot isostatic press manufacturing process for monolithic nuclear fuel; Nuclear Engineering and Design 254 (2013) 43-52. Journal homepage: www.elsevier.com/locate/nucengdes.

* cited by examiner

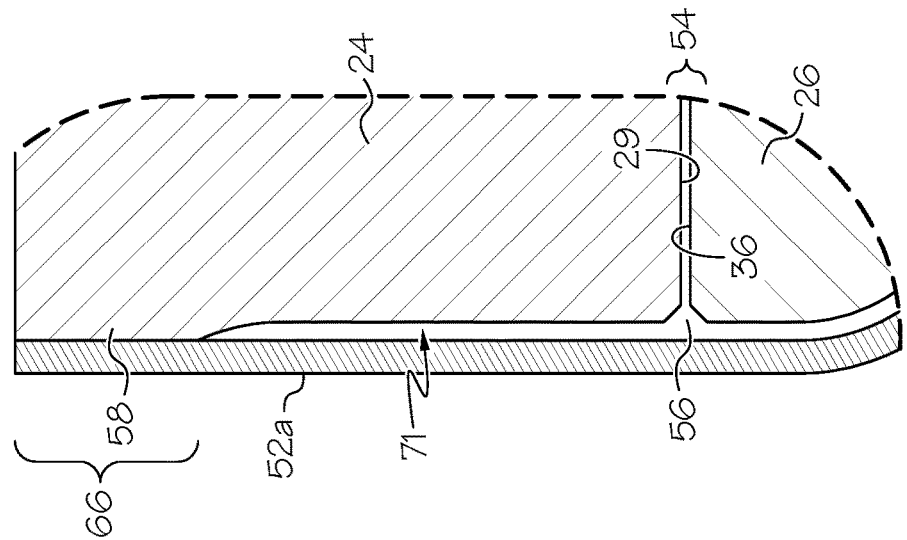
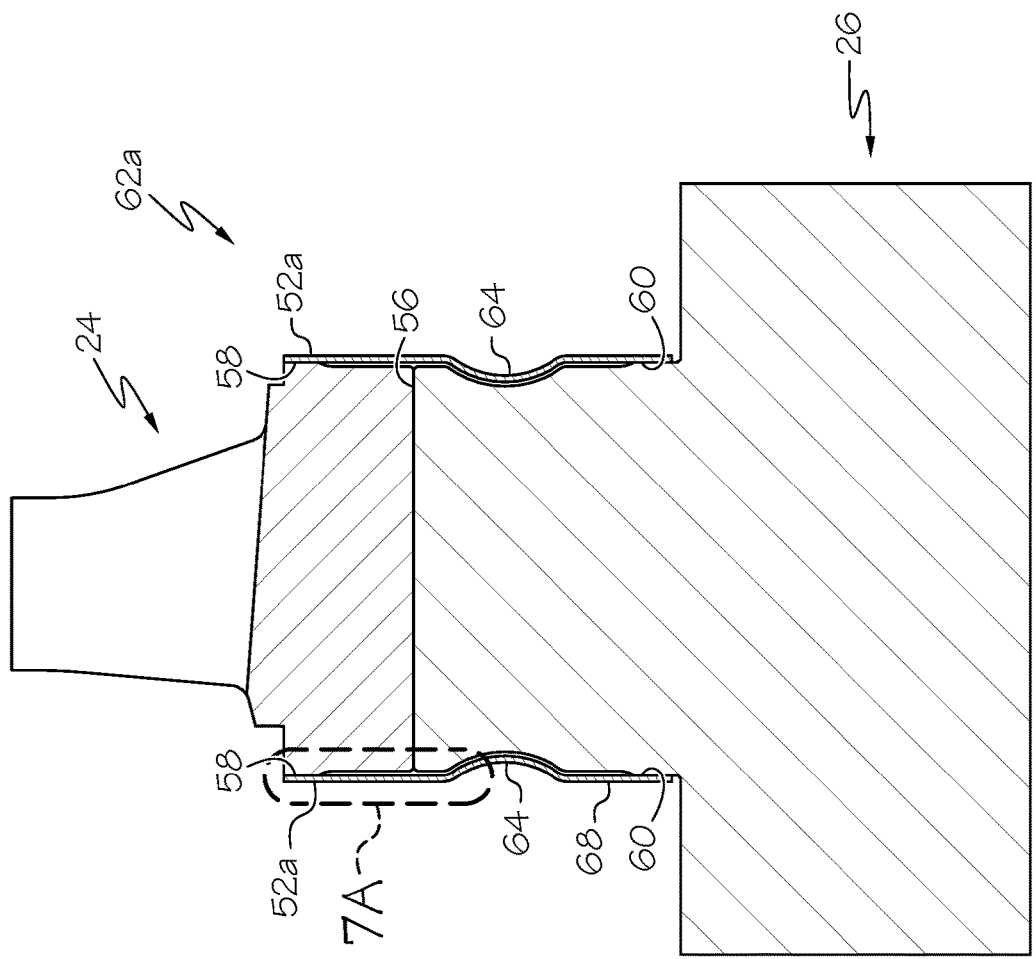

DUAL ALLOY TURBINE ROTORS AND METHODS FOR MANUFACTURING THE SAME

CROSS-REFERENCE TO RELATED APPLICATIONS

This application is a divisional of U.S. patent application Ser. No. 14/297,406 filed on Jun. 5, 2014. The relevant disclosure of the above application is incorporated herein by reference.

TECHNICAL FIELD

The present invention generally relates to gas turbine engines, and more particularly relates to dual alloy turbine rotors and methods for manufacturing the same.

BACKGROUND

Aircraft gas turbine engines including auxiliary power units (APUs) and main propulsion engines may incorporate dual alloy turbine (DAT) rotors. A conventional dual alloy turbine rotor comprises a blade ring made of a first alloy having a desired characteristic and a hub of a second alloy having another different desired characteristic. For example, hubs have been formed from alloys that have high tensile strength and low-cycle fatigue resistance. Blade rings that are exposed to the higher temperatures of the combustion gas path and higher centrifugal loads have been integrally cast as one piece (hereinafter a "unitary blade ring") from equi-axed alloys that have high stress rupture and creep resistance. The hub is fabricated separately from the blade ring. Hot isostatic pressing (HIP) facilitates diffusion bonding of the two dissimilar alloy components (the blade ring and the hub) to form the dual alloy turbine rotor. Vacuum sealing the interface between the blade ring and the hub is necessary for acceptable diffusion bond formation. Metal containers or "cans" have been used to completely enclose and vacuum seal the interface and dual alloy components during HIP. Unfortunately, these containers are unsuitable for some applications due to container leakage and geometric limitations.

In another known method (the so-called "shrink fit method") for manufacturing a dual alloy turbine rotor, the cast unitary blade ring and hub are assembled with an interference fit. The interface between the cast unitary blade ring and hub is vacuum sealed by brazing to form a braze joint. Braze material is deposited in a shallow groove at the external surfaces of the interface between the cast unitary blade ring and hub. A subsequent vacuum braze thermal cycle completes braze joint formation. The assembled cast unitary blade ring and hub are then bonded together by the HIP process. The interference fit between the cast unitary blade ring and the hub is used to protect the integrity of the fragile braze joint, i.e., the interference fit is used to ensure that no gapping of the interface occurs during the vacuum braze thermal cycle and subsequent cool down. The interference fit imposes hoop stresses on the cast unitary blade ring when the cast unitary blade ring and hub are at the same temperature. The hoop stresses can potentially get worse depending on the relative coefficients of thermal expansion and temperature distribution during the vacuum braze thermal cycle.

In addition, in some gas turbine engines, it would be desirable to use single crystal or directionally solidified (DS) blade airfoils in the blade ring, rather than equi-axed alloy blade airfoils. Single crystal superalloys offer superior high temperature creep strength, for example. However, it is technically difficult to cast unitary blade rings with single crystal and directionally solidified alloys. In addition, while individual single crystal and directionally solidified airfoil blades may be brazed or diffusion bonded into an assembled blade ring (in contrast to a unitary blade ring), the blade-to-blade joints (hereinafter "blade braze joints") in the assembled blade ring lack sufficient strength to withstand the high tensile hoop stresses imposed in the shrink-fit method for manufacturing the dual alloy turbine rotor. More specifically, with the interference fit and a higher thermal expansion of the hub relative to the assembled blade ring during a vacuum braze thermal cycle, the assembled blade ring is subject to fracture because of the high tensile hoop stresses. Therefore, manufacture of a dual alloy turbine rotor including an assembled blade ring of a single crystal alloy, a directionally solidified alloy, or an equi-axed alloy has not been possible.

Hence, there is a need for dual alloy turbine rotors and methods for manufacturing the same. There is also a need to minimize stress on the assembled blade ring during vacuum sealing of the interface between the assembled blade ring and hub, thereby substantially preventing assembled blade ring fracture and allowing the use of single crystal, directionally solidified, or equi-axed alloy blade airfoils in an assembled blade ring of the dual alloy turbine rotor.

BRIEF SUMMARY

Methods are provided for manufacturing dual alloy turbine rotors. In accordance with one exemplary embodiment, a method for manufacturing a dual alloy turbine rotor comprises positioning a hub within a blade ring to thereby define an interface therebetween. A pair of diaphragms encloses the interface. The interface is vacuum sealed. The blade ring is bonded to the hub after the vacuum sealing step.

Methods are provided for manufacturing dual alloy turbine rotors in accordance with yet another exemplary embodiment of the present invention. The method for manufacturing a dual alloy turbine rotor comprises forming a rotor assembly. The rotor assembly is formed by positioning a hub within an assembled blade ring with an interface therebetween and vacuum sealing the interface by bonding a pair of diaphragms to the assembled blade ring and the hub so that the pair of diaphragms bridges the interface. The interface comprises a non-contacting interface if the coefficient of thermal expansion of the hub is greater than that of the assembled blade ring. The interface comprises a contacting interface if the coefficient of thermal expansion of the hub is less than that of the assembled blade ring. The rotor assembly is hot isostatic pressed at a hot isostatic pressing temperature and pressure to effect metallurgical bonding of the assembled blade ring to the hub.

Dual alloy turbine rotors are provided in accordance with yet another exemplary embodiment of the present invention. The dual alloy turbine rotor comprises an assembled blade ring and a hub bonded to the assembled blade ring. The assembled blade ring comprises a first alloy selected from the group consisting of a single crystal alloy, a directionally solidified alloy, or an equi-axed alloy. The hub comprises a second alloy.

Furthermore, other desirable features and characteristics of the methods and dual alloy turbine rotors will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 7 is a cross-sectional view of a rotor assembly in which diaphragms are diffusion bonded to the blade ring and the hub, in accordance with exemplary embodiments;

FIG. 7A is an exploded view of the encircled portion of the rotor assembly of FIG. 7, depicting one of the diaphragms diffusion bonded to the blade ring and hub (diffusion bonding to the hub not shown in FIG. 7A);

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments of the present invention are directed to dual alloy turbine rotors and methods for manufacturing the same. The method according to exemplary embodiments minimizes tensile hoop stresses on the blade ring during vacuum sealing of the interface between the blade ring and hub during dual alloy turbine rotor manufacture. In addition, the method according to exemplary embodiments minimizes stress on the blade ring and hub as a result of a greater thermal expansion of the hub relative to the blade ring.

Figure 1:
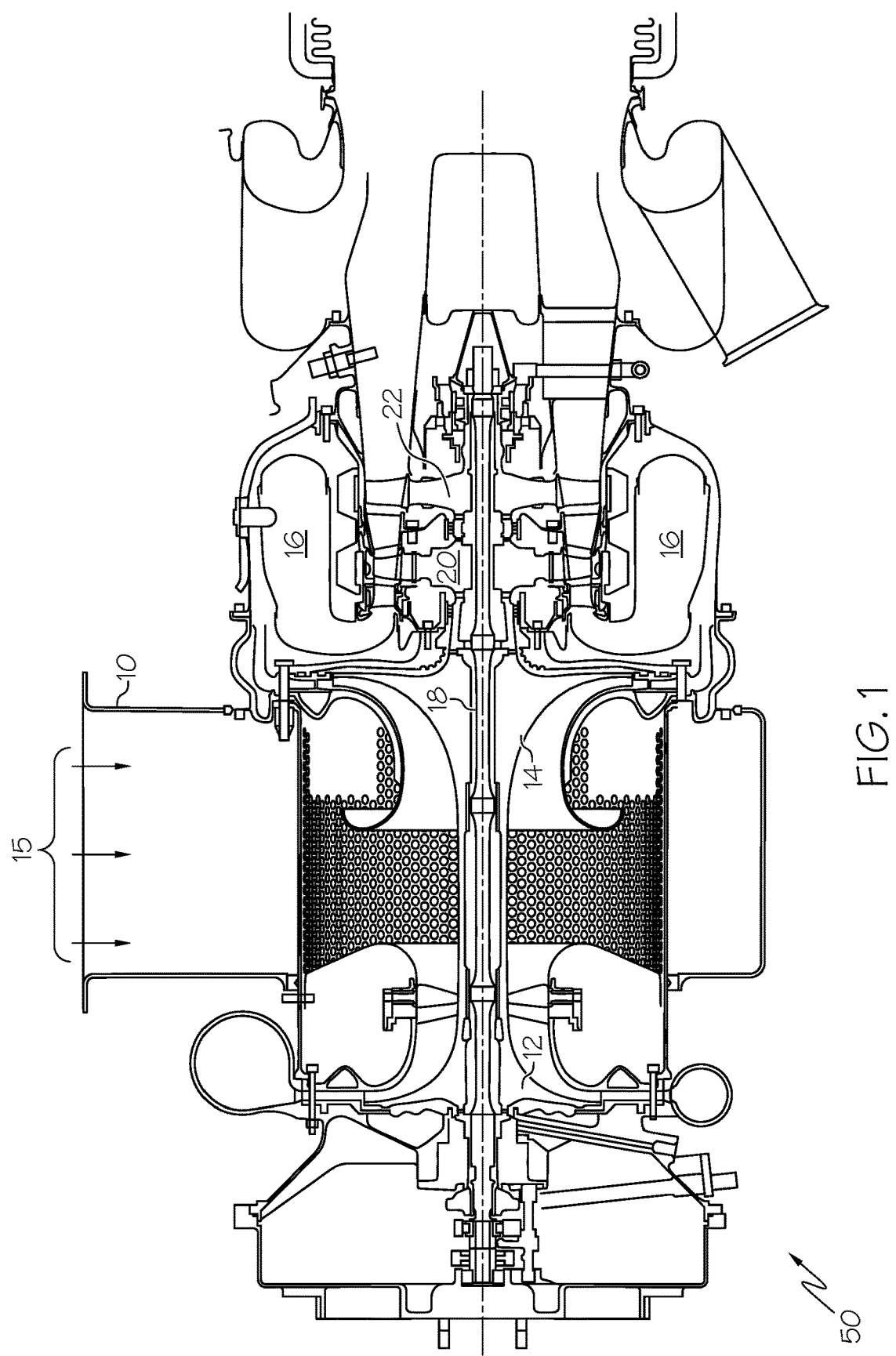
FIG. 1 is a cross-sectional view of an exemplary gas turbine engine (an aircraft APU) including a dual alloy turbine rotor according to an embodiment of the present invention.

FIG. 1 is a cross-sectional view of an aircraft APU 50 including an exemplary dual alloy turbine rotor according to an embodiment of the present invention. During operation of the APU 50, an inlet 10 receives ambient airflow 15, which is then directed to either a load compressor 12 or an engine compressor 14. Both compressors 12 and 14 are rotatably mounted on a shaft 18. The load compressor 12 draws in and compresses air for use as part of an environment control system (ECS) to cool and heat the aircraft interior. The engine compressor 14 draws in and compresses air that will be used during combustion. A combustor 16 receives fuel from a fuel source and the compressed air from the engine compressor 14. Fuel combustion produces high temperature combustion gas that is provided to a two-stage power turbine assembly. The high temperature combustion gas flows along airfoil blades on a first-stage dual alloy turbine rotor 20, causing it to rotate. After passing the first-stage dual alloy turbine rotor 20, the air flows to airfoil blades on a second-stage dual alloy turbine 22. The first and second-stage dual alloy turbine rotors 20 and 22 are both mounted on the shaft 18. Rotation of the two-stage dual alloy turbine rotors generates work to drive the compressors 12 and 14, and to power other aircraft components. Although a dual-stage dual alloy turbine rotor is incorporated into the APU 50 depicted in FIG. 1, the first-stage dual alloy turbine rotor 20 may be included in different multi-stage turbine assemblies that include three or more turbines in series. As will be subsequently described in detail, the architecture and materials for the first-stage dual alloy turbine rotor 20 enables its continued operational exposure to high temperature combustion gas flowing directly from the combustor 16.

Figure 3:
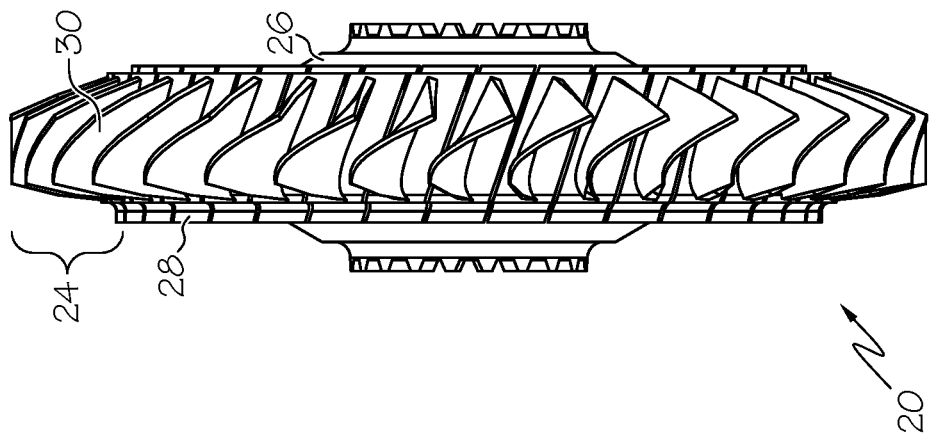
FIG. 3 is a side view of the dual alloy turbine rotor of FIGS. 1 and 2.
Figure 2:
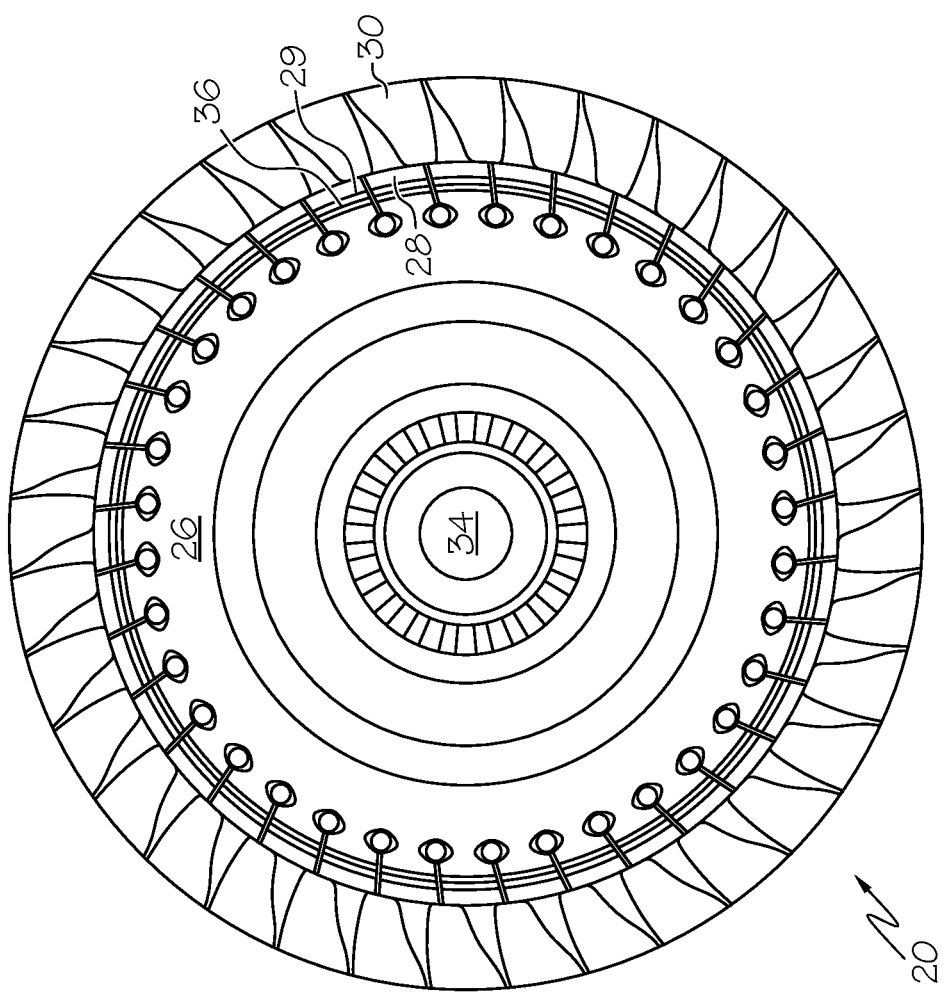
FIG. 2 is a front view of the dual alloy turbine rotor of FIG. 1.
Figure 4:
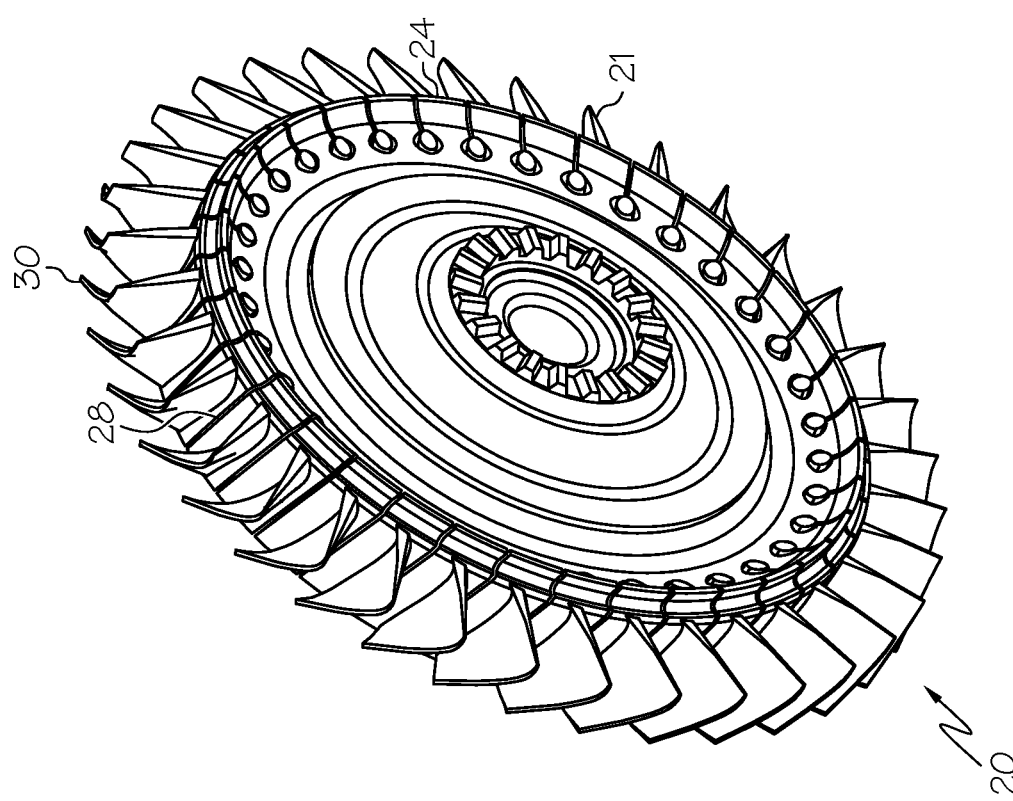
FIG. 4 is a perspective view of the dual alloy turbine rotor of FIGS. 1 through 3.
Figure 6:
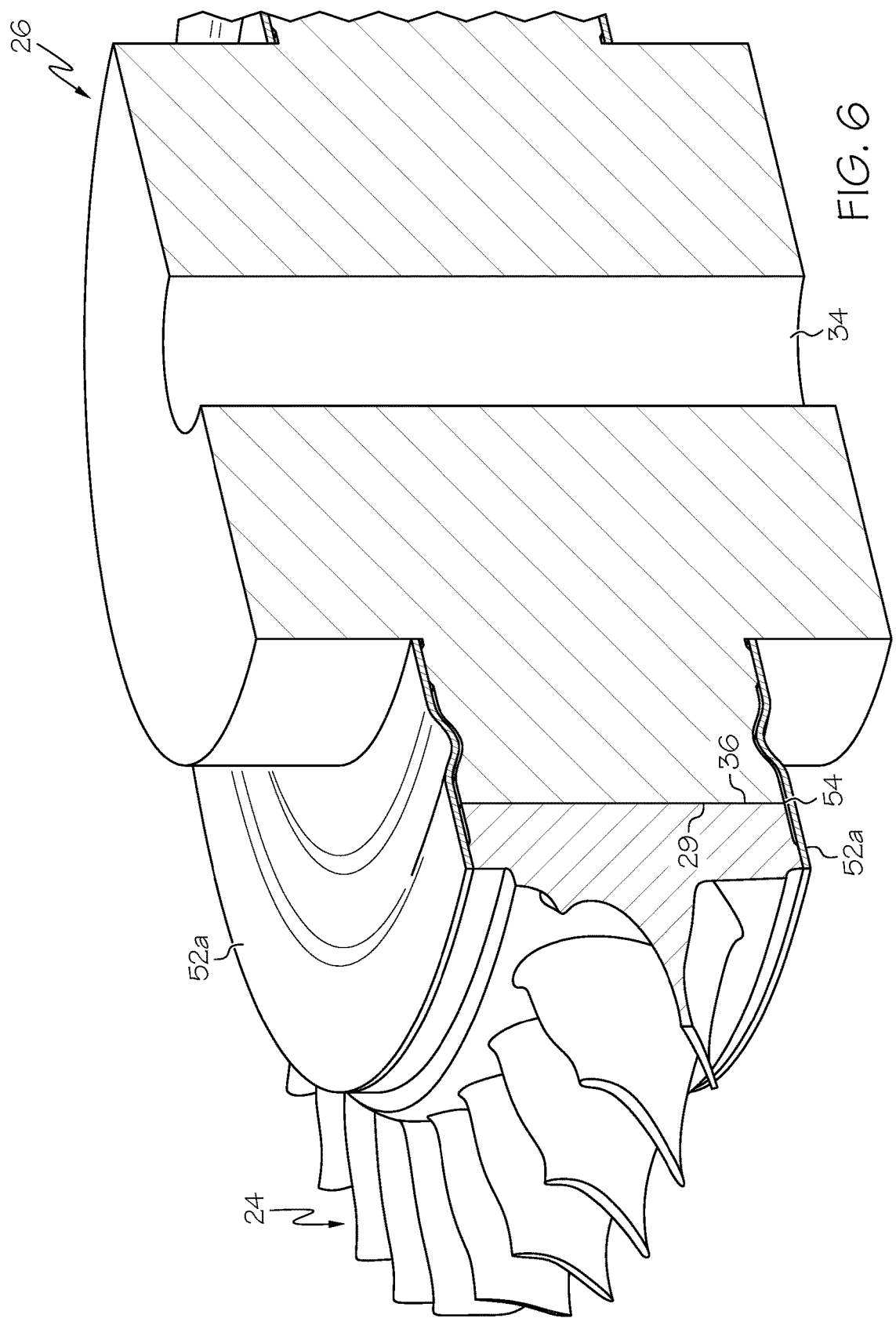
FIG. 6 is an isometric view of a portion of a rotor assembly including a portion of a hub, a blade ring, and a pair of diaphragms.

FIGS. 2 through 4 provide different views of the dual alloy turbine rotor 20. The dual alloy turbine rotor 20 includes an annular blade ring 24 and a hub 26. The annular blade ring 24 is designed to withstand high combustion gas path temperatures (typically about 1800° Fahrenheit (° F.) to about 3000° F.) while the hub 26 is designed to withstand loading at more moderate temperatures. The blade ring comprises a first alloy that exhibits superior creep strength at the high combustion gas path temperatures. The blade ring 24 includes a ring portion 28 with an inner annular surface 29 (FIG. 2) that defines an opening (not shown) for receiving the hub 26 as hereinafter described. The blade ring 24 includes a raised external surface portion 58 (e.g., FIG. 7) or a groove 59 (FIG. 10) in an external surface thereof for purposes as hereinafter described. In an embodiment, the blade ring is an assembled blade ring. The assembled blade ring comprises a plurality of individually cast airfoil blades 30 extending radially outwardly therefrom and formed into the ring portion 28. The individually cast blades 30 are formed into the ring portion of the blade ring with a blade braze joint (not shown) between each of the individually cast blades. In an embodiment, the first alloy of the assembled blade ring comprises a single crystal alloy, a directionally solidified alloy, or an equi-axed alloy. The single crystal alloy comprises chemistry specially formulated for high temperature stress rupture and oxidation resistance. Suitable exemplary single crystal alloys include CMSX-3® and CMSX-4® alloys. The directionally solidified alloy comprises chemistry specially formulated for high temperature stress rupture and oxidation resistance. A suitable exemplary directionally solidified alloy includes MAR-M-247® alloy. An equi-axed alloy comprises chemistry specially formulated for high temperature stress rupture and oxidation resistance. Suitable exemplary equi-axed alloys include nickel-based superalloys such as Inconel IN738, MAR-M 247, etc.

The hub 26 of the dual alloy turbine rotor 20 has a centrally-formed bore 34 and an outer peripheral surface 36. The hub 26 comprises a second alloy that is different from the first alloy. The hub includes a raised hub exterior surface portion 60 (e.g., FIG. 8) or a groove 61 (FIG. 10) in an external surface portion for purposes as hereinafter described. The second alloy has a relatively high tensile strength as known in the art. The hub may be forged from a powdered metal alloy such as Rene 95, Astroloy PM, or other fine-grained alloys.

Figure 5:
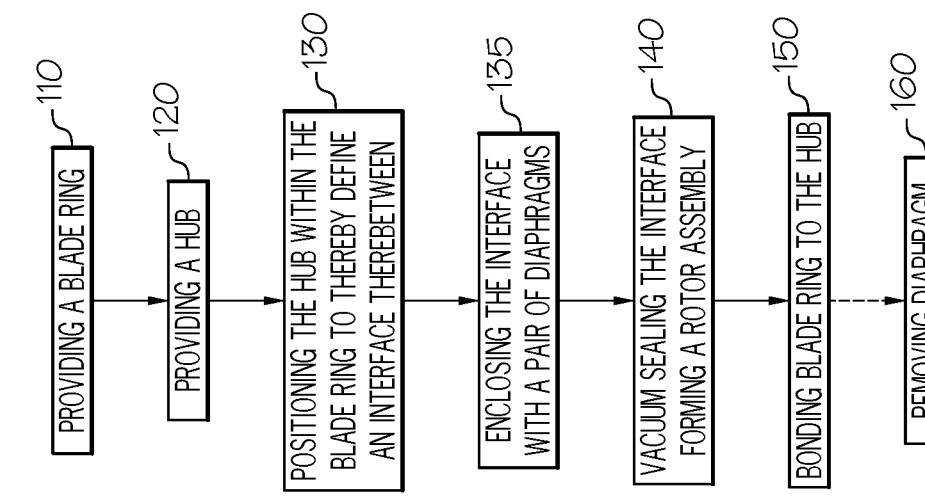
FIG. 5 is a flow diagram that outlines an exemplary method for manufacturing a dual alloy turbine rotor such as depicted in FIGS. 1 through 4, according to an embodiment of the present invention.

The dual alloy turbine rotor 20 described above and depicted in FIGS. 1 through 4 may be manufactured using a method 100 depicted in FIG. 5. Referring now to FIG. 5, according to exemplary embodiments, a method 100 for manufacturing a dual alloy turbine rotor begins by providing the blade ring (step 110) and the hub (step 120) as described above. As noted above, in an embodiment, the blade ring 24 is an assembled blade ring comprising a first alloy. The first alloy comprises a single crystal alloy, a directionally solidified alloy, or an equi-axed alloy. The blade ring 24 provided in the method for manufacturing the dual alloy turbine rotor according to exemplary embodiments may alternatively comprise a conventional integrally cast unitary blade ring such as a cast unitary blade ring comprising an equi-axed alloy.

Still referring to FIG. 5 and now to FIGS. 6 through 11, the method 100 for manufacturing a dual alloy turbine rotor continues by positioning the hub within the opening (not shown) of the blade ring to define an interface 54 between the hub and the blade ring (step 130). The interface 54 is between the outer peripheral surface 36 of the hub and the inner annular surface 29 of the blade ring. As shown in FIGS. 6 through 11, the outer peripheral surface 36 of the hub 26 faces the inner annular surface 29 of the blade ring 24.

In one embodiment, with the assembled blade ring, when the coefficient of thermal expansion (CTE) of the hub is greater than that of the blade ring, the interface comprises a non-contacting interface between the outer peripheral surface of the hub and the inner annular surface of the blade ring. With the non-contacting interface, the hub and blade ring are physically separated and do not contact, forming a gap 56 between the outer peripheral surface of the hub and the inner annular surface of the blade ring. For example, as shown in FIGS. 7 and 7A, the inner annular surface 29 of the blade ring 24 is spaced apart from the outer peripheral surface 36 of the hub 26 to define the gap 56. The gap that exists at the non-contacting interface at initial positioning (step 130) permits substantially stress-free vacuum sealing of the interface as hereinafter described, i.e., there is substantially no stress imposed on the blade ring during the vacuum sealing step. As hereinafter described, the size of the gap 56 decreases during the vacuum sealing step due to the higher coefficient of thermal expansion (CTE) of the hub relative to the blade ring. The radial gap is sized to accommodate potential growth differences due to coefficients of thermal expansion and thermal gradients.

In an alternative embodiment, when the first alloy of the assembled blade ring has a higher CTE (rather than a lower CTE) than the second alloy of the hub, the interface comprises a contacting interface as a result of step 130, such that the outer peripheral surface of the hub is positioned in near full or full surface contact with the inner annular surface of the blade ring when the hub is disposed within the opening in the blade ring. The blade ring inner diameter is shaped to receive the outer circumferential surface of the hub in near full or full surface area contact at the blade ring-hub surface interface. During the vacuum sealing step as hereinafter described, the blade ring outgrows the hub as a result of the higher CTE of the blade ring relative to the hub and results in the gap 56 being formed at the interface. The value of the thermal expansion may be predicted by methods as known in the art. For example, the relative geometry of the blade ring will grow to a greater degree relative to the geometry of the hub that is made of the second alloy having a lower coefficient of thermal expansion, i.e., the step of vacuum sealing the interface results in a temperature increase causing the blade ring with the higher coefficient of thermal expansion to expand more than the hub that is less responsive to temperature changes. Thus, the contacting interface becomes looser forming the gap 56 and the gap stress reduction function remains, i.e., the gap substantially prevents stress to the blade ring during the vacuum sealing step. In the case of a unitary blade ring, the interface may be a contacting or a non-contacting interface as a result of step 130.

Referring again to FIG. 5, and to FIGS. 6 through 11, according to exemplary embodiments, method 100 continues with enclosing the interface with a pair of opposing diaphragms 52a, 52b, or 52c (step 135). The diaphragms comprise a metal material that can withstand hot isostatic pressing (HIP) processing temperatures of about 1000° C. to about 1300° C., as hereinafter described. In order to alleviate thermal expansion stresses, the metal material selected for the diaphragms may have a coefficient of thermal expansion that is intermediate the respective coefficient of thermal expansions for the first alloy and the second alloy. Non-limiting examples of suitable metal material for the diaphragms include nickel-based and iron-based alloys, etc. The diaphragms may be configured in a number of different ways, as hereinafter described. As noted above, the diaphragms "enclose" the interface. As used herein, the term "enclose" refers to the diaphragms 52a, 52b, or 52c bridging the interface unlike the conventional "can" method that completely encloses the interface and the dual alloy components (the blade ring and hub). While diaphragms 52a, 52b, or 52c have been described, it is to be understood that diaphragms with different configurations may be used to enclose and vacuum seal the interface.

Still referring to FIG. 5, according to exemplary embodiments, the method 100 for manufacturing a dual alloy turbine rotor continues by vacuum sealing the interface (step 140). In general, the vacuum sealing step comprises bonding the diaphragms to the blade ring 24 and to the hub 26 to complete formation of a rotor assembly. The interface between the blade ring and the hub is vacuum sealed with the pair of diaphragms. Unlike the conventional "can" method that acts to transfer the HIP processing pressure to the enclosed interface and dual alloy components, the diaphragms serve only to seal the interface and provide structural fuses that may deform either plastically or elastically to substantially prevent transferring of stress onto the blade ring. The diaphragms help withstand the deflection imposed by the CTE difference between the blade ring and the hub, allowing the blade ring to remain substantially stress-free during manufacture of the dual alloy turbine rotor 20.

Referring now specifically to FIGS. 7 and 7A, according to exemplary embodiments of the present invention, the step of vacuum sealing the interface comprises diffusion bonding the diaphragms 52a directly to the blade ring 24 and the hub 26 forming the rotor assembly 62a. The diaphragm 52a may be configured as a flexible, annular diaphragm that is substantially flat (FIGS. 7 and 8) or flat (FIG. 8) with a thickness of about 0.125 mm to about 3 mm. Diaphragm 52a may be referred to herein as a "shun-style diaphragm." More particularly, the diaphragm 52a bridges the gap 56 at the interface 54 and may have a formed intermediate portion 64 (the concave intermediate portion 64 of FIG. 7) between a diaphragm first portion 66 and a diaphragm second portion 68. The interface may be vacuum sealed by diffusion bonding the diaphragm first portion 66 directly to the raised exterior surface portion 58 of the blade ring and the diaphragm second portion 68 directly to the raised hub exterior surface 60. The intermediate portion is disposed across the gap 56 at the interface and defines a free or unbounded space 71 between the diaphragm and the blade ring and hub respectively adjacent to and including the interface. The unbounded space permits the plastic and/or elastic deformation of the diaphragm during the vacuum sealing step. Direct diffusion bonding eliminates the need for braze material and brazing as hereinafter described. Diffusion bonding the diaphragm to the blade and to the hub applies only an axial compressive loading on the blade ring rather than a radial load as in the case of the conventional shrink-fit approach and no tensile hoop stress is present during the vacuum sealing step. It is to be appreciated that the diffusion bonding method is exemplary only; it is to be understood that Transient Liquid Phase (TLP) bonding as well known in the art may be used as an alternative to diffusion bonding in vacuum sealing step 140.

Figure 8:
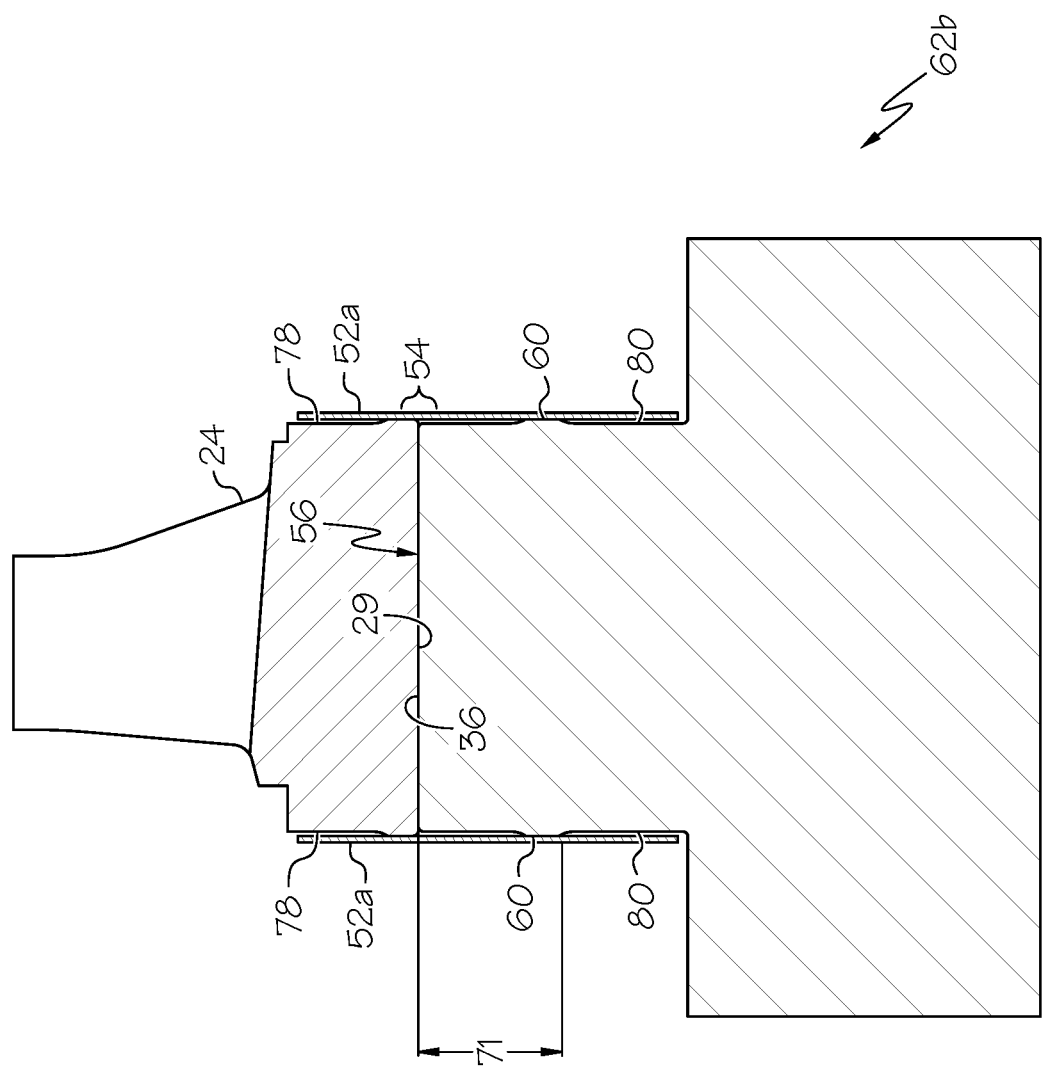
FIG. 8 is a cross-sectional view of an exemplary rotor assembly formed in the manufacture of the dual alloy turbine rotor, depicting the diaphragms brazed to the blade ring and hub in accordance with exemplary embodiments.
Figure 9:
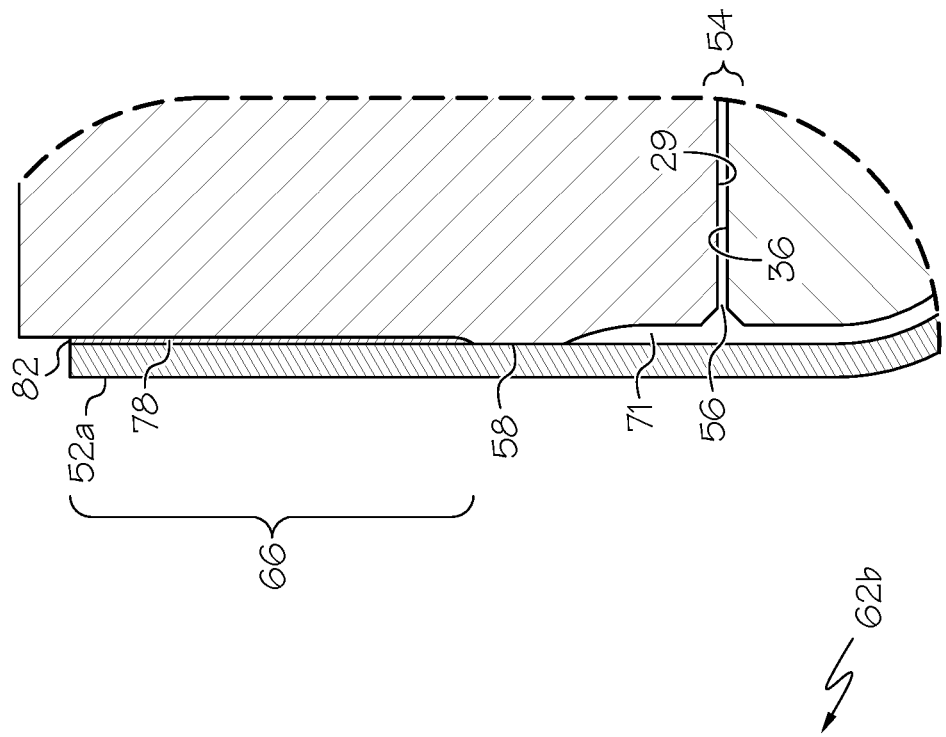
FIG. 9 is a cross-sectional view of an exemplary rotor assembly in which diaphragms (shim-styled diaphragms) are brazed to the blade ring and the hub, in accordance with exemplary embodiments.
Figure 9A:
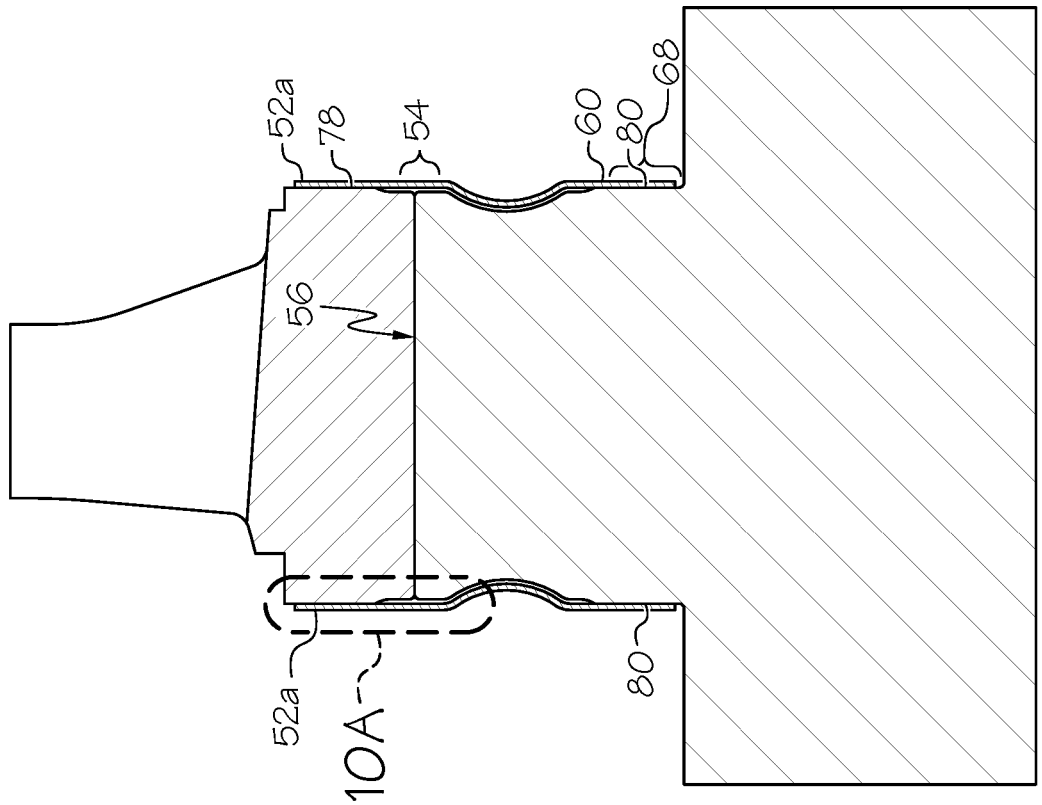
FIG. 9A is an exploded view of the encircled portion of the rotor assembly of FIG. 9.

Referring again to FIG. 5 and now to FIGS. 8 through 9A, in accordance with alternative exemplary embodiments, the step of vacuum sealing the interface (step 140) comprises bonding the diaphragm 52a to the blade ring 24 and to the hub 26 by brazing. Known braze application techniques and braze materials may be used. The braze material has a melting temperature that is lower than a melting temperature of the blade ring and the hub. The braze material may be a braze foil, a braze paste, a plated layer, etc.

Still referring to FIGS. 9 through 9A, the diaphragms 52a are disposed against the exterior surface of the blade ring and hub such that the intermediate portion (an unformed intermediate portion in FIG. 8) of each diaphragm bridges the gap 56 at the interface 54 and the diaphragm first portion 66 (e.g., FIG. 9A) is brazed to the exterior surface portion of the blade ring outboard of the raised exterior portion 58 and the diaphragm second portion 68 (e.g., FIG. 9) is brazed to the exterior surface portion of the hub inboard of the raised hub exterior surface portion 60. The diaphragm 52a defines opposing braze gaps 78 and 80 that are spaced away from the interface 54 and are configured to receive braze material 82 (FIG. 9). The opposing raised exterior surfaces 58 and 60 serve as opposing braze stops that substantially prevent braze material 82 flow into the interface 54 from the opposing braze gaps 78 and 80. The opposing braze gaps are defined outboard of the braze stops. The opposing braze gaps 78 and 80 comprise a first braze gap 78 defined between the diaphragm first portion 66, the exterior surface of the blade ring 24, and the raised external surface portion 58 that serves as a braze stop and a second braze gap 80 is defined between the diaphragm second portion 68, the exterior surface of the hub 26, and the raised hub exterior surface portion 60 that also serves as a braze stop. The first and second braze gaps 78 and 80 are configured to receive the braze material 82 to form opposing braze joints. The braze stops are spaced away from the interface to substantially prevent the braze flow and braze contamination of the interface. The space 71 between the braze stops is substantially free of braze material. As noted above, the unbounded space 71 permits the plastic and/or elastic deformation of the diaphragm during the vacuum sealing step. The spacing between the braze stops is also designed to ensure sufficient diaphragm length exists to absorb thermal growth differences between the blade ring and the hub, without exceeding the ductility of the diaphragm material or adversely loading the braze joints.

Figure 10:
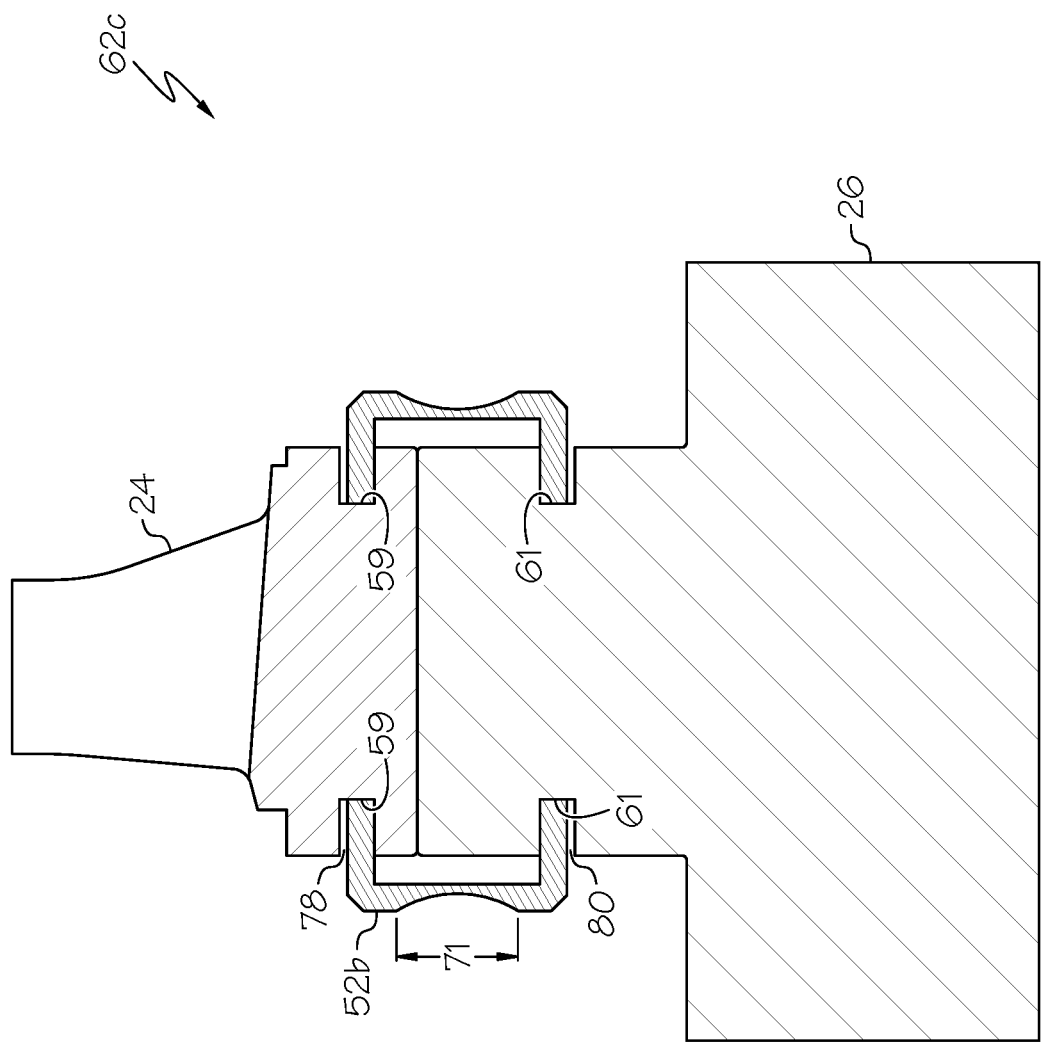
FIG. 10 is a cross-sectional view of an exemplary rotor assembly including a substantially U-shaped diaphragm, in accordance with exemplary embodiments.

Referring now to FIG. 10, in another exemplary embodiment, a rotor assembly 62c comprises the blade ring 24, the hub 26, and diaphragm 52b. Diaphragm 52b is configured with a substantially U-shaped cross-section. The apex of the substantially U-shaped diaphragm may be convolute to provide predictable, controlled yielding. The "legs" of the substantially U-shaped diaphragm 52b may be pressed into the opposing grooves 59 and 61 in the blade ring and hub. The grooves serve to transfer load into the diaphragm without tensile loading of the braze joints in the blade ring. The substantially U-shaped diaphragm 52b is press fit at the internal diameter ("ID") of the grooves 59 and the external diameter ("OD") of the grooves 61 and defines the opposing braze gaps 78 and 80. The braze gaps are defined by the portion of each groove that is not occupied by the legs of the diaphragm. The braze gaps 78 and 80 receive braze material to braze the diaphragms to the blade ring and hub to form the rotor assembly 62c. As noted previously, the opposing braze gaps are configured to receive braze material to form the braze joints and are spaced away from the interface so as to substantially prevent braze contamination of the interface. The convolute portion of the diaphragm 52b serves as a flex zone, the flex zone being the annular region between raised external surface portion 58 and the raised hub exterior surface portion 60.

Figure 11:
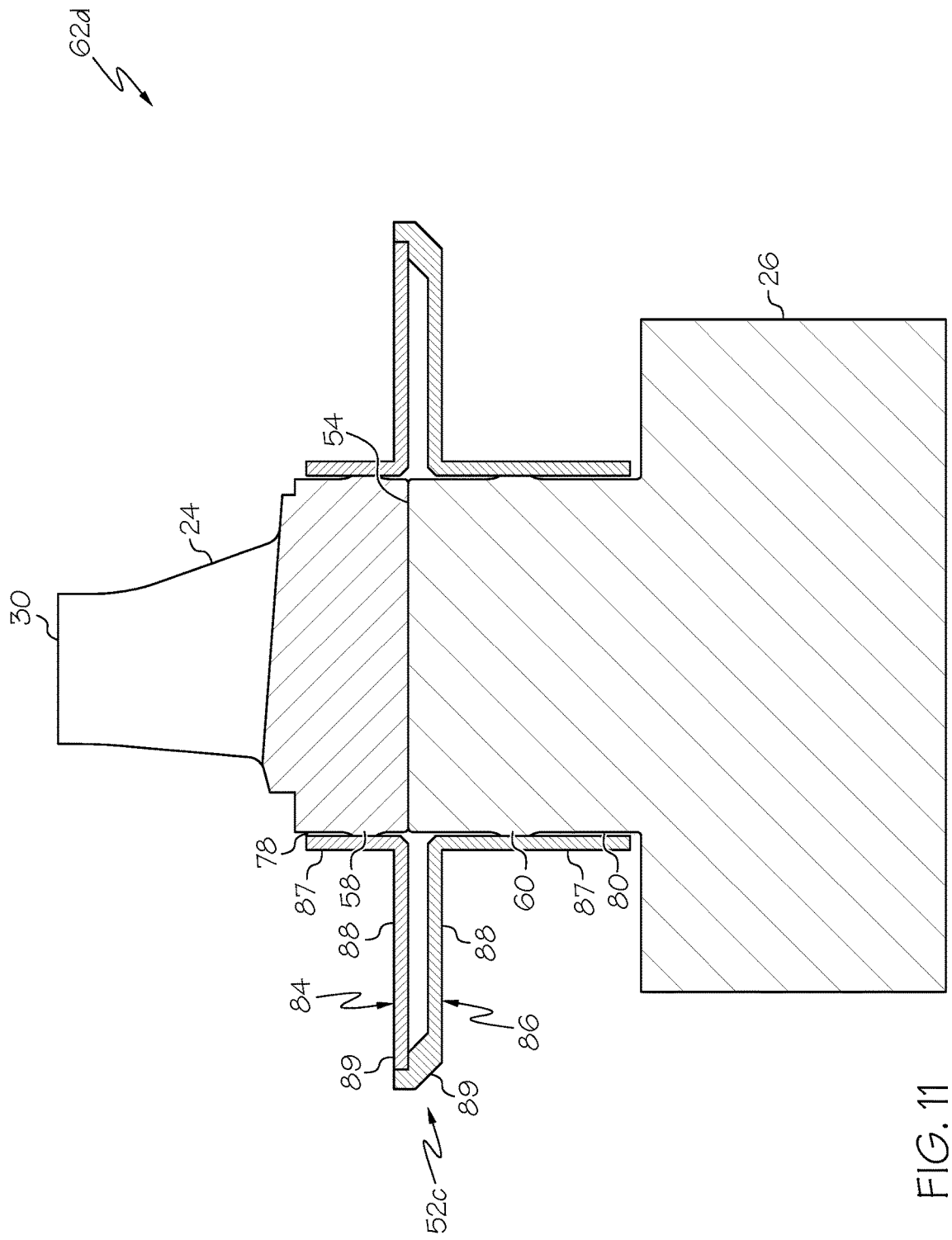
FIG. 11 is a cross-sectional view of an exemplary rotor assembly in which the diaphragm comprises a fabricated thermal spring diaphragm.

Referring now to FIG. 11, in another exemplary embodiment, a rotor assembly 62d comprises the blade ring 24, the hub 26, and diaphragm 52c. Diaphragm 52c may be configured as a two-piece fabricated spring assembly ("referred to herein as a "thermal spring diaphragm"), with an outer spring portion 84 and an inner spring portion 86. The spring portions each comprise a relatively flat annular portion 87 and a relatively thin, relatively long cylindrical flange 88 with an end portion 89 to facilitate joining of the end portions to form the diaphragm 52c. More particularly, the outer and inner spring portions 84 and 86 may be fabricated separately and their respective end portions 89 brazed or welded together to form the diaphragm 52c. The diaphragms may be bonded to the blade ring and to the hub by brazing in the same manner as described above for diaphragms 52a (FIGS. 8 and 9). In particular, the outer spring portion 84 is brazed to the exterior surface portion of the blade ring outboard of the raised exterior portion 58 and the inner spring portion 86 is brazed to the exterior surface portion of the hub inboard of the raised hub exterior surface portion 60. The diaphragm 52c defines opposing braze gaps 78 and 80 that are spaced away from the interface 54 and are configured to receive braze material 82 (not shown in FIG. 11). The opposing raised exterior surfaces 58 and 60 serve as opposing braze stops that substantially prevent braze material 82 flow into the interface 54 from the opposing braze gaps 78 and 80. The opposing braze gaps are defined outboard of the braze stops. The opposing braze gaps 78 and 80 comprise a first braze gap 78 defined between an exterior surface of the blade ring 24 and the raised external surface portion 58 that serves as a braze stop and a second braze gap 80 is defined between the exterior surface of the hub 26, and the raised hub exterior surface portion 60 that also serves as a braze stop. The first and second braze gaps 78 and 80 are configured to receive the braze material 82 to form opposing braze joints. While vacuum sealing by diffusion bonding, TLP bonding, and brazing have been described, diaphragms 52a, 52b, or 52c may alternatively or additionally be bonded to the blade ring and hub by electron beam welding.

Figure 12:
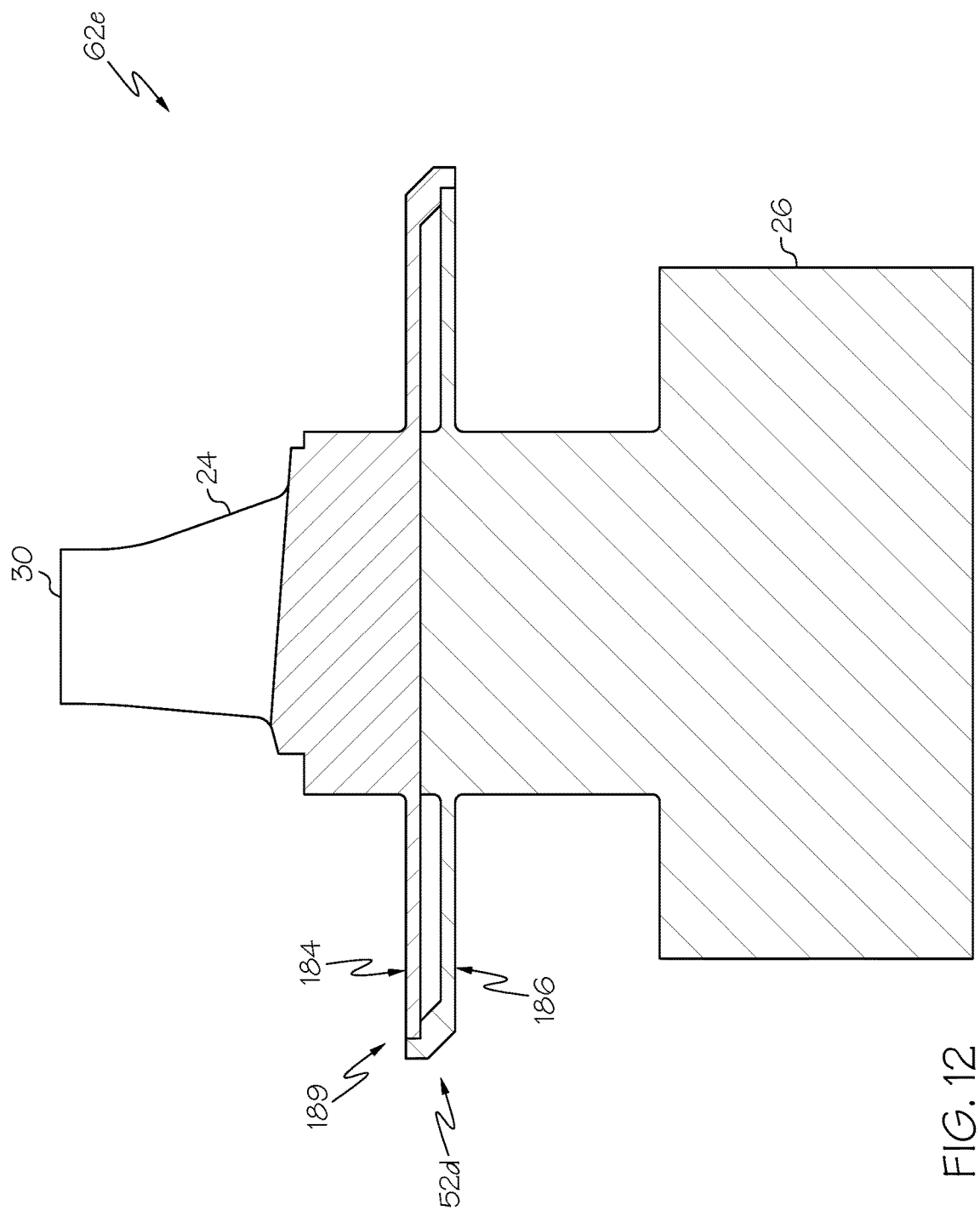
FIG. 12 is a cross-sectional view of an exemplary rotor assembly in which each of the blade ring and hub respectively include a portion of an integrally machined thermal spring diaphragm.

Referring now to FIG. 12, according to an alternative exemplary embodiment, an upper spring portion 184 of a diaphragm 52d may be integrally machined as one piece with the blade ring 24 and a lower spring portion 186 integrally machined as one piece with the hub 26. End portions 189 of the top and bottom spring portions of the diaphragm may be brazed together to vacuum seal the interface between the hub and the blade ring. The gap 56 is defined at the interface between the end portions 189. The gap between the blade ring and hub results in a loose fit between the blade ring and the hub in rotor assembly 62e. Stress at the joint between the outer and inner spring portions can be minimized and tuned by varying the thickness and length of the spring portions. While vacuum sealing by brazing end portions 189 together has been described for rotor assembly 62e of FIG. 12, end portions 189 may alternatively or additionally be bonded together by electron beam welding.

Referring again to FIG. 5, the method 100 for manufacturing a dual alloy turbine rotor continues by bonding the blade ring to the hub after the vacuum sealing step (step 150). The blade ring may be bonded to the hub by hot isostatic pressing of the rotor assembly. Hot isostatic pressing is a process in which pressure is applied equally in all directions through an inert gas in a pressure vessel. Hot isostatic pressing may be performed at a hot isostatic pressing temperature and pressure to effect metallurgical bonding of the blade ring to the hub. The HIP process closes the gap formed at the positioning step (step 130) or the gap formed during the vacuum sealing step such that the outer peripheral surface of the hub in the dual alloy turbine rotor is substantially flush against the blade ring inner annular surface. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature and pressure may be higher or lower and the HIP processing time may be shorter or longer. The HIP process is generally known in the art.

Still referring to FIG. 5, according to exemplary embodiments, the method 100 for manufacturing a dual alloy turbine rotor may further comprise the step of removing the diaphragm after the bonding step 150 (step 160). The diaphragm may be removed by turning, milling, grinding, polishing, and/or other known methods. The dual alloy turbine rotor may undergo further processing including a finishing treatment. Finishing treatments may include, for example, aging, solutioning, annealing, quenching, peening, polishing, or coatings, or the like. If necessary, the dual alloy turbine rotor may be machined to final specifications. In some exemplary embodiments, no finishing treatments are necessary. Although such treatments are referred to here as a "finishing" treatment, such treatments may be used at other times.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Accordingly, dual alloy turbine rotors and methods for manufacturing the same have been provided. The dual alloy turbine rotors manufactured in accordance with exemplary embodiments as described herein include assembled blade rings that remain substantially stress-free during dual alloy turbine rotor manufacture, thereby substantially preventing their fracture during manufacture. The assembled blade rings may therefore include single crystal, directionally solidified, or equi-axed alloy blade rings.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A dual alloy turbine rotor comprising:
an assembled blade ring comprising a first alloy selected from the group consisting of a single crystal alloy, a directionally solidified alloy, or an equi-axed alloy, the assembled blade ring has a ring portion with an inner annular surface and a plurality of blades coupled to the ring portion opposite the inner annular surface;
a hub comprising a second alloy and bonded to the assembled blade ring, the hub has a centrally formed bore and an outer peripheral surface spaced radially apart from the centrally formed bore and the outer peripheral surface has opposed exterior surfaces and the outer peripheral surface of the hub is positioned within the inner annular surface to define an interface therebetween; and a pair of diaphragms coupled to the assembled blade ring and hub, respectively, to define opposing braze gaps spaced away from the interface and configured to receive a braze material.

2. The dual alloy turbine rotor of claim 1, wherein the assembled blade ring includes an inner annular surface and the hub is disposed within the assembled blade ring and has an outer peripheral surface flush against the assembled blade ring inner annular surface.

3. The dual alloy turbine rotor of claim 1, wherein the inner annular surface of the assembled blade ring has opposed exterior surfaces.

4. The dual alloy turbine rotor of claim 3, wherein the interface comprises a non-contacting interface if the coefficient of thermal expansion of the hub is greater than that of the assembled blade ring and a contacting interface if the coefficient of thermal expansion of the hub is less than that of the assembled blade ring.

5. The dual alloy turbine rotor of claim 3, wherein the pair of diaphragms are directly bonded to the exterior surfaces of the ring portion of the assembled blade ring and the exterior surfaces of the outer peripheral surface of the hub so that the pair of diaphragms bridge the interface on opposing sides.

6. The dual alloy turbine rotor of claim 5, wherein each of the exterior surfaces of the ring portion has a raised external surface portion that extends outwardly from the respective exterior surface of the ring portion and each of the exterior surfaces of the outer peripheral surface have a raised hub external surface portion that extends outwardly from the respective exterior surface of the outer peripheral surface, and the pair of diaphragms are bonded to the raised exterior portions of the ring portion and the raised hub external surface portions of the outer peripheral surface to define opposing gaps that are spaced away from the interface.

7. The dual alloy turbine rotor of claim 6, wherein the braze material is received within each of the gaps.

8. The dual alloy turbine rotor of claim 5, wherein the exterior surfaces of the ring portion each define a first groove and the exterior surfaces of the outer peripheral surface each define a second groove, and the pair of diaphragms are coupled to the first groove and the second groove to bridge the interface on opposing sides.

9. The dual alloy turbine rotor of claim 5, wherein each of the pair of diaphragms include an outer spring portion and an inner spring portion, the respective outer spring portion is bonded to the ring portion of the blade ring and the respective inner spring portion is bonded to the outer peripheral surface of the hub.

10. A dual alloy turbine rotor comprising:
a blade ring comprising a first alloy selected from the group consisting of a single crystal alloy, a directionally solidified alloy, or an equi-axed alloy, the blade ring including an inner annular surface;
a hub comprising a second alloy different from the first alloy, the hub disposed within the blade ring to define an interface between the hub and the blade ring, the hub having an outer peripheral surface flush against the blade ring inner annular surface, and the hub is bonded to the blade ring; and
a pair of diaphragms coupled to the assembled blade ring and hub, respectively, to define opposing braze gaps spaced away from the interface and configured to receive a braze material.

11. The dual alloy turbine rotor of claim 10, wherein the blade ring comprises a plurality of individually cast airfoil blades coupled to a ring portion to define an assembled blade ring.

12. The dual alloy turbine rotor of claim 10, wherein the blade ring is a unitary blade ring integrally cast from an equi-axed alloy.

13. The dual alloy turbine rotor of claim 10, wherein the hub has a centrally formed bore and an outer peripheral surface spaced radially apart from the centrally formed bore and the outer peripheral surface has opposed exterior surfaces, and the blade ring has a ring portion with an inner annular surface and a plurality of blades coupled to the ring portion opposite the inner annular surface, the inner annular surface having opposed exterior surfaces, and the outer peripheral surface of the hub is positioned within the inner annular surface to define the interface therebetween.

14. The dual alloy turbine rotor of claim 13, wherein the interface comprises a non-contacting interface if the coefficient of thermal expansion of the hub is greater than that of the blade ring and a contacting interface if the coefficient of thermal expansion of the hub is less than that of the blade ring.

15. The dual alloy turbine rotor of claim 13, wherein the pair of diaphragms are directly bonded to the exterior surfaces of the ring portion of the blade ring and the exterior surfaces of the outer peripheral surface of the hub so that the pair of diaphragms bridge the interface on opposing sides.

16. The dual alloy turbine rotor of claim 15, wherein each of the exterior surfaces of the ring portion has a raised external surface portion that extends outwardly from the respective exterior surface of the ring portion and each of the exterior surfaces of the outer peripheral surface have a raised hub external surface portion that extends outwardly from the respective exterior surface of the outer peripheral surface, and the pair of diaphragms are bonded to the raised exterior portions of the ring portion and the raised hub external surface portions of the outer peripheral surface to define opposing gaps that are spaced away from the interface.

17. The dual alloy turbine rotor of claim 16, wherein the braze material is received within each of the gaps.

18. The dual alloy turbine rotor of claim 15, wherein the exterior surfaces of the ring portion each define a first groove and the exterior surfaces of the outer peripheral surface each define a second groove, and the pair of diaphragms are coupled to the first groove and the second groove to bridge the interface on opposing sides.

19. The dual alloy turbine rotor of claim 15, wherein each of the pair of diaphragms include an outer spring portion and an inner spring portion, the respective outer spring portion is bonded to the ring portion of the blade ring and the respective inner spring portion is bonded to the outer peripheral surface of the hub.

\* \* \* \* \*